United States Patent
Courteille et al.

(10) Patent No.: US 9,703,734 B2
(45) Date of Patent: Jul. 11, 2017

(54) INPUT/OUTPUT DEVICE TRANSFERRING RECEIVING DATA TO CONTROL DEVICE OVER PHYSICAL ETHERNET CONNECTION USING FRAME CONSTRUCTION WITH UDP/IP AND MAC TRANSMISSION LAYERS

(71) Applicant: SAGEM DEFENSE SECURITE, Boulogne-Billancourt (FR)

(72) Inventors: Jean-Marie Courteille, Boulogne-Billancourt (FR); Francois Leroy, Boulogne-Billancourt (FR)

(73) Assignee: SAGEM DEFENSE SECURITE, Boulogne-Billancourt (FR)

(*) Notice: Subject to any disclaimer, the term of this patent is extended or adjusted under 35 U.S.C. 154(b) by 265 days.

(21) Appl. No.: 14/650,048

(22) PCT Filed: Dec. 4, 2013

(86) PCT No.: PCT/EP2013/075477
§ 371 (c)(1),
(2) Date: Jun. 5, 2015

(87) PCT Pub. No.: WO2014/086823
PCT Pub. Date: Jun. 12, 2014

(65) Prior Publication Data
US 2015/0324307 A1    Nov. 12, 2015

(30) Foreign Application Priority Data
Dec. 7, 2012  (FR) .................................. 12 61794

(51) Int. Cl.
*G06F 13/00*    (2006.01)
*G06F 13/28*    (2006.01)
(Continued)

(52) U.S. Cl.
CPC .......... *G06F 13/28* (2013.01); *G06F 13/4221* (2013.01); *H04L 12/4015* (2013.01); *H04L 12/413* (2013.01); *H04L 12/2697* (2013.01)

(58) Field of Classification Search
CPC .. G06F 13/28; H04L 12/2697; H04L 12/4221
See application file for complete search history.

(56) References Cited

U.S. PATENT DOCUMENTS 7,406,050 B2 *  7/2008  Calluaud ............. H04L 12/2697
                                                 370/250
7,505,400 B2 *  3/2009  Bibby .................. G05D 1/0077
                                                 370/217
(Continued)

FOREIGN PATENT DOCUMENTS

EP    1 469 652 A1    10/2004
EP    1 672 874 A1    6/2006
(Continued)

OTHER PUBLICATIONS

Jan. 30, 2014 Search Report issued in International Application No. PCT/EP2013/075477.

*Primary Examiner* — Tammara Peyton
(74) *Attorney, Agent, or Firm* — Oliff PLC; R. Brian Drozd

(57) ABSTRACT

The invention relates to a input/output device transferring and/or receiving data to and/or from a control device, wherein the input/output device transfers the data to the control device over a physical connection of the Ethernet type according to a UDP/IP protocol, the input/output device being connected to a plurality of data processing or acquisition devices by means of at least one connection different from the Ethernet physical connection and in that the input/output device includes means for connecting at least one other input/output device to the Ethernet connection and for managing the transmission over the Ethernet connection (Continued)

of the data transmitted by the input/output devices to the control device.

12 Claims, 8 Drawing Sheets

(51) Int. Cl.
*G06F 13/42* (2006.01)
*H04L 12/40* (2006.01)
*H04L 12/413* (2006.01)
*H04L 12/26* (2006.01)

(56) References Cited

U.S. PATENT DOCUMENTS

| | | | |
|---|---|---|---|
| 9,189,195 B2* | 11/2015 | Block | G01C 23/00 |
| 2002/0144010 A1* | 10/2002 | Younis | G06F 9/546 |
| | | | 719/314 |
| 2006/0130134 A1 | 6/2006 | Colas | |

FOREIGN PATENT DOCUMENTS

| | | | |
|---|---|---|---|
| WO | WO 2006036728 A1 * | 4/2006 | G05D 1/0077 |
| WO | 2011/159209 A1 | 12/2011 | |
| WO | 2011/159210 A1 | 12/2011 | |

* cited by examiner

INPUT/OUTPUT DEVICE TRANSFERRING RECEIVING DATA TO CONTROL DEVICE OVER PHYSICAL ETHERNET CONNECTION USING FRAME CONSTRUCTION WITH UDP/IP AND MAC TRANSMISSION LAYERS

The present invention relates to an input/output device transferring and/or receiving data to and/or from a control device.

Conventionally, a control device has a plurality of inputs/outputs. These inputs/outputs are integrated in the control device.

The number of inputs/outputs varies greatly according to the use of the control device.

For example, when a control device is placed in an aircraft, it must be able to process data received or transmitted by various items of equipment according to various communication protocols.

In addition, when the control device is replaced, the safety conditions in the avionic field require the fabricator or equipment manufacturer to carry out many tests in order to guarantee the reliability of the control device that he is offering. These reliability tests are very expensive financially and are often lengthy.

The aim of the present invention is to solve the drawbacks of the prior art by proposing an input/output device that can easily provide a changeable number of inputs/outputs for the control device.

To this end, according to a first aspect, the invention proposes an input/output device transferring and/or receiving data to and/or from a control device, characterised in that the input/output device transfers the data to the control device over a physical connection of the Ethernet type according to a UDP/IP protocol, the input/output device being connected to a plurality of data processing or acquisition devices by means of at least one connection different from the Ethernet physical connection and in that the input/output device comprises means for connecting at least one other input/output device to the Ethernet connection and for managing the transmission over the Ethernet connection of the data transmitted by the input/output devices to the control device.

Thus the input/output device, by communicating with the control device over a physical connection of the Ethernet type, can be separated from the control device. If an upgrade or change to the control device must be made, it is not necessary to have to requalify the input/output device. The reliability tests related to the avionics field are thus reduced.

In addition, by having available means for connecting another input/output device, the number of inputs/outputs available to the control device is open to change. By managing the transmission over the Ethernet connection of the data transmitted by the input/output devices to the control device, only one Ethernet connection is necessary for connecting the control device to the inputs/outputs.

According to a particular embodiment of the invention, the input/output device comprises means for constructing Ethernet frames, means for analysing Ethernet frames and means for storing data.

Thus the control device needs only one type of connection for communicating with appliances communicating according to another protocol and/or transmission medium. Qualification of the control device for avionic applications is simplified.

According to a particular embodiment of the invention, the means for connecting at least one other input/output device consist of a switch, the switch allowing the transfer of Ethernet frames by the input/output device to the control device or allowing the transfer of Ethernet frames by the other input/output device to the control device.

Thus only one Ethernet connection is necessary for connecting the control device to the inputs/outputs.

According to a particular embodiment of the invention, the means for connecting at least one other input/output device consist of a three-state logic port controlled so as to be in a high-impedance state when the input/output device is not transferring Ethernet frames to the control device.

Thus only one Ethernet connection is necessary for connecting the control device to the inputs/outputs.

According to a particular embodiment of the invention, the means for managing the transmission over the Ethernet connection trigger the transfer of an Ethernet frame by the input/output device to the control device following the reception of a synchronisation Ethernet frame sent by the control device.

Thus the present invention manages the transfer of Ethernet frames simply and prevents collisions.

According to a particular embodiment of the invention, the means for managing the transmission over the Ethernet connection trigger the transfer of an Ethernet frame by the input/output device to the control device following the reception of an Ethernet frame sent by the control device to one of the input/output devices or following the transmission of an Ethernet frame sent by the other input/output device.

Thus the present invention manages the transfer of Ethernet frames simply and prevents collisions.

According to a particular embodiment of the invention, the input/output device comprises means for selecting the moment at which the input/output device transfers the Ethernet frame to the control device.

Thus it is possible to parameterize the order in which the input/output devices transmit Ethernet frames.

According to a particular embodiment of the invention, the means for managing the transmission over the Ethernet connection trigger the transfer of an Ethernet frame by the input/output device to the control device at a rate predetermined by a clock.

Thus the present invention manages the transfer of the Ethernet frames simply and prevents collisions.

According to a particular embodiment of the invention, the input/output device comprises means for notifying, to the other input/output device, the instant at which the other input/output device must transfer an Ethernet frame by means of the input/output device to the control device.

Thus the present invention manages the transfer of Ethernet frames simply and prevents any collisions.

According to a particular embodiment of the invention, the input/output device comprises means for receiving, from the other input/output device, the instant at which the input/output device must transfer an Ethernet frame by means of the input/output device to the control device.

Thus the present invention manages the transfer of Ethernet frames simply and prevents any collisions.

The invention also relates to a system comprising an input/output device and a control device, the input/output device transferring and/or receiving data to and/or from a control device, characterised in that the input/output device transfers the data to the control device over a physical connection of the Ethernet type according to a UDP/IP protocol, the input/output device being connected to a plurality of data processing or acquisition devices by means of at least one connection different from the Ethernet physical connection, the input/output device comprises means for connecting at least one other input/output device to the Ethernet connection and for managing the transmission over the Ethernet connection of the data transmitted by the input/output devices to the control device and in that the control device comprises an operating system, real-time or not.

The invention also relates to an aircraft, characterised in that it comprises the input/output device according to the present invention.

The features of the invention mentioned above, as well as others, will emerge more clearly from a reading of the following description of an example embodiment, said description being given in relation to the accompanying drawings, among which:

Figure 1:
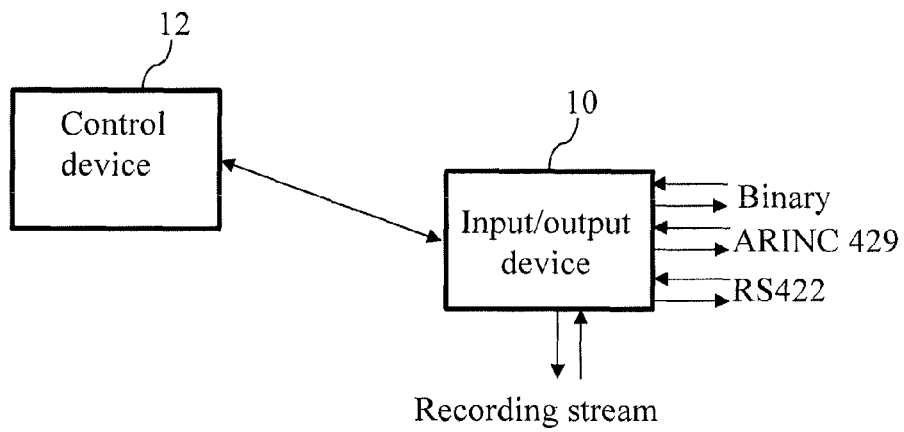
FIG. 1 depicts an example of interconnection of an input/output device with a control device.

According to the present invention, the input/output device 10 enables a control device 12 to receive or transfer data from or to various types of inputs/outputs.

The control device 12 has an operating system, real-time or not. The control device 12 is for example an item of equipment placed in an aircraft that controls a plurality of input/output interfaces.

According to the invention, the control device 12 is connected to an input/output device 10 by means of an Ethernet connection. The input/output interfaces are controlled via the input/output device 10.

More precisely, the Ethernet connection is of the 100/1000 Mbit/s Ethernet type and relies on UDP/IP protocols.

The connection, according to embodiments of the present invention, may not be an Ethernet connection. The bandwidth of the connection may be suitable for supporting data rates between the control device 12 and all the input/output devices 10 that are connected thereto.

It should be noted also that the transfers made over the connection are done at a rate higher than that of all the input/output ports of the input/output devices 10 that are connected thereto.

The data are sent and transmitted by the control device 12 directly from its main volatile memory, via a conventional Ethernet port, by means of a mechanism for direct access to the memory or DMA (Direct Memory Access).

The input/output device 10 has for example at least one input/output interface in accordance with the standard ARINC 429 developed and maintained by the Airlines Electronic Engineering Committee (AEEC).

The input/output device 10 has for example at least one RS-422 input/output interface. RS-422 is the simplified name of the standard ANSI/TIA/EIA-422-B developed by the American National Standards Institute (ANSI) and of the equivalent international recommendation ITU-T-T-REC-V.11, also known by the term X.27.

The input/output device 10 has for example at least one binary interface to which at least one sensor and/or one actuator is connected.

The input/output device 10 has for example at least one interface and allows reception of a data stream recording the flight of the aircraft.

Naturally, the input/output device 10 may have other input/outputs in accordance with standards or recommendations other those aforementioned.

The input/output device 10 functions as a UDP server. The input/output device 10 awaits frames comprising MAC/IP addresses and a UDP port number corresponding to those of the input/output device 10.

The control device 12 functions as a client. The control device 12 launches exchanges with the input/output device 10.

The control device 12 receives frames from the input/output device 10 in an Ethernet/UDP/IP format. For each frame comprising data issuing from an ARINC 429 port, the control device 12 puts the data and the time stamp associated with the data respectively and simultaneously in two tables.

For each frame comprising data issuing from the other ports of the input/output device 10, the control device 12 puts the data in FIFO (First In First Out) reception memories.

The control device 12 comprises an applicative programming interface enabling the content of the two tables and the FIFO reception memories to be read.

The control device 12 comprises an applicative programming interface enabling writing in FIFO transmission memories.

The input/output device 10 receives data from each ARINC 429 and/or RS-422 port and temporarily memorizes the data received in FIFO reception memories.

In addition, the input/output device 10 reports any reception errors on all its input ports to the control device 12.

Figure 2A:
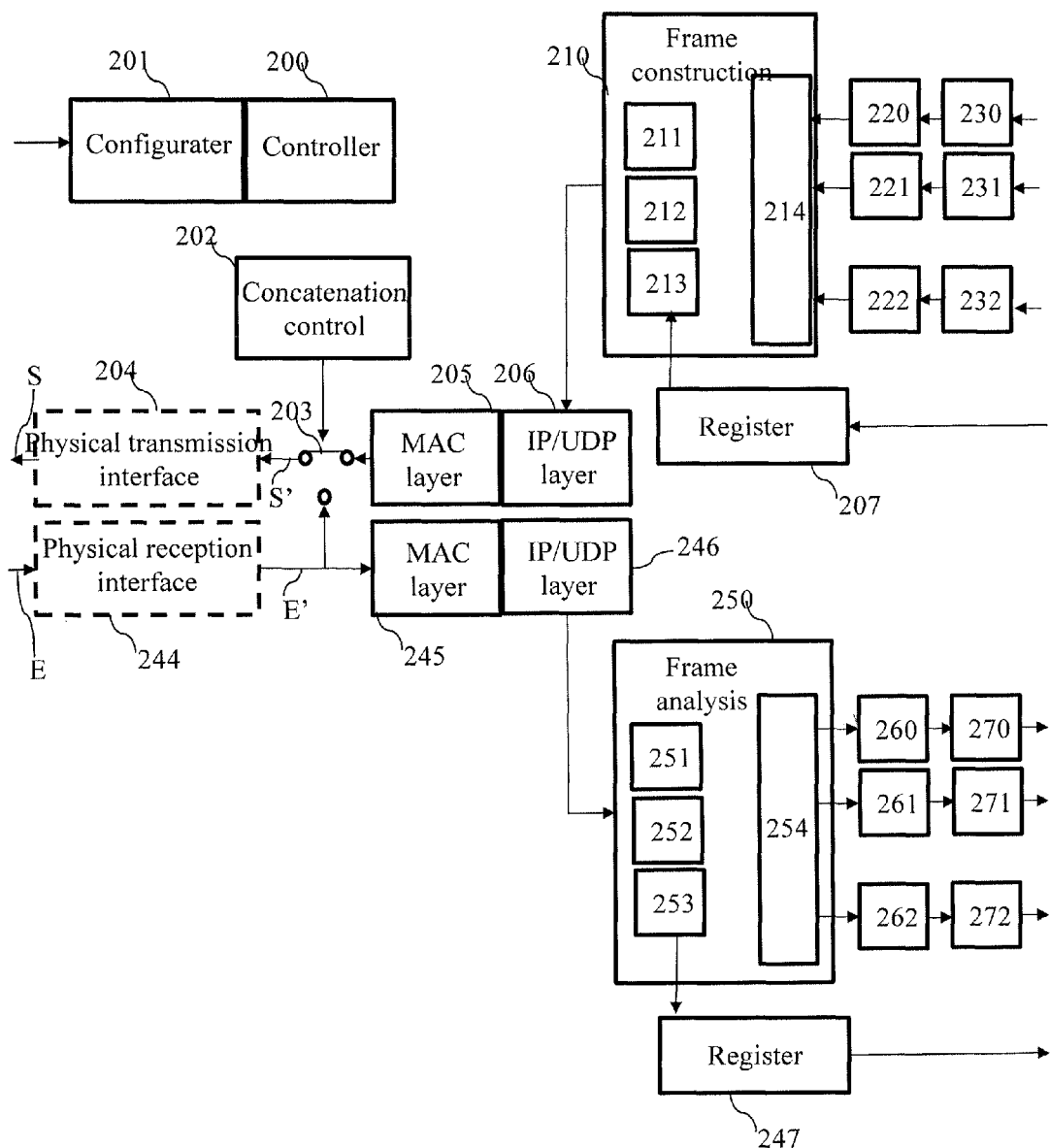
FIG. 2a depicts a first example embodiment of the input/output device accessible by means of an Ethernet connection.

FIG. 2a depicts a first example embodiment of the input/output device accessible by means of an Ethernet connection.

The input/output device 10 is represented by an example embodiment where it comprises three ARINC 429 and/or RS-422 ports as well as a binary data port.

It should be noted here that the input/output device 10 is an electronic component that does not comprise an operating system and implements the UDP/IP protocols in a manner reduced to the minimum necessary and sufficient for guaranteeing interoperability with all types of operating system that the control device 12 is liable to comprise. Conversely, such an implementation may be applied in the control device 12.

These features are particularly advantageous when it is installed in an aircraft. This is because the certification constraints are high in the aeronautical field. By producing an input/output device 10 distinct from the control device 12 and devoid of any software operating system or comprising an operating system having limited functionalities, the certification and qualification of the input/output device 10 is simplified and needs to be carried out only once even if the control device 12 changes over time.

The input/output device 10 comprises a controller 200 that manages all the operations performed by the various components of the input/output device 10 that will be described hereinafter.

If the control device 12 has a real-time operating system, the controller 200 controls the transfer of an Ethernet frame on detection of the reception of a synchronisation Ethernet frame sent by the control device 12 in a predefined order and indicated by means of at least two binary inputs of the configurator 201 as will be explained with regard to FIG. 4a.

If the control device 12 has a real-time operating system, the controller 200 controls the transfer of an Ethernet frame sent by the control device 12 or by at least one other input/output device 10 interconnected to the input/output device 10 in a predefined order indicated by means of at least two binary inputs of the configurator 201 as will be explained with regard to FIG. 4a.

If the control device 12 has a non-real-time operating system, the controller 200 controls the transfer of the same number of Ethernet frames as Ethernet frames received on detection of the reception of the Ethernet frames sent by the control device 12 and intended for the input/output device 10 in a predefined order and indicated by means of at least two binary inputs of the configurator 201.

The input/output device 10 comprises a configurator 201 which, according to the present invention, configures the input/output device 10 in a point to point operating mode with the control device 12 or in an operating mode where a plurality of input/output devices 10 are connected to the same control device 12.

The configurator 201, using the logic level of at least one binary input, determines which configuration is selected and configures the input/output device 10 according to the configuration selected.

The configurator 201, using the logic level of at least one binary input, identifies the input/output device 10 from the other input/output devices 10 connected to the control device 12.

The input/output device 10 comprises a concatenation command 202 and a switch 203. The concatenation command 202, using instructions received from the configurator 201, controls the switch 203.

The input/output device 10 may comprises a transmission physical interface 204 and a reception physical interface 244 when it is distant from the control device 12 and/or other input/output devices 10.

According to the concatenation command 202, the switch 203 makes it possible to connect the cable connection used for transmitting Ethernet frames to the control device 12 to the cable connection used for the transmission, by the control device 12, of Ethernet frames. In other words the switch 203 connects the output S of the transmission interface 204 to the input E of the reception physical interface when the two interfaces 204 and 244 are included in the input/output device 10 or the input E' by means of which Ethernet frames are received by the input/output device 10 to the output S' by means of which Ethernet frames are sent by the input/output device when the two interfaces 204 and 244 are not included in in the input/output device 10.

According to the concatenation command 202, the switch 203 connects the components constructing Ethernet/UDP/IP frames to the cable connection used for the transmission of Ethernet frames to the control device 12. In other words the switch 203 connects the module managing MAC layers 205 to the transmission physical interface 204 via or not input/output devices 10.

The concatenation control 202 controls, according to some embodiments, three-state ports.

The input/output device 10 comprises a frame-construction module 210, a module managing UDP/IP transmission layers 206 and MAC transmission layers 205, which are the components constructing Ethernet/UDP/IP frames.

The frame-construction module 210 comprises a frame header construction module 211. The frame-construction module 210 forms, for each frame, a header comprising the MAC addresses of the input/output device 10 and of the control device 12, a fixed field IPv4, a UDP field and an end of frame FCS field comprising the Ethernet standard cyclic redundancy code.

The frame-construction module 210 comprises a port register state module 212. The port register state module inserts in the frame the filling level of the input FIFO memory of each ARINC 429 and RS-422 port and the filling level of the output FIFO memory of each ARINC 429 and RS-422 port.

The input/output device 10 comprises, in the example in FIG. 2a, a first input interface 230 of the ARINC 429 type, a second input interface 231 of the ARINC 429 type and an input interface 232 of the RS-422 type.

The input interface 230 is connected to a FIFO memory 220, the input interface 231 is connected to a FIFO memory 221 and the input interface 232 is connected to a FIFO memory 222.

The FIFO memories 220, 221 and 222 are each connected to a plurality of respective registers included in the register module 214 of the frame-construction module 210.

The FIFO memories 220, 221 and 222 help to withstand the timing variations inherent in non-real-time operating systems.

The frame-construction module 210 is also connected to a register 207 via a module 213. The module 213 stores the binary data received from at least one sensor via the register 207.

The input/output device 10 comprises a frame-analysis module 250, a module for managing UDP/IP 246 and MAC 245 reception layers, which are the components analysing Ethernet/UDP/IP frames received from the control device 12. The frame-analysis module 250 comprises a frame header analysis module 251.

The frame header analysis module 251 analyses, for each frame received, the MAC addresses of the input/output device 10 and the control device 12, an IPv4 field, a UDP field and an end of frame FCS field comprising the Ethernet standard cyclic redundancy check so as to determine whether the frame has been correctly received. In the case where the destination MAC address, or the destination IP address or the destination UDP port number are not those expected, or if the FCS is incorrect, the frame-analysis module 250 ignores the frame received.

The frame-analysis module 250 comprises a module 252 for the state of the FIFOs 262, 261, 262 described subsequently. The module 252 for the state of the FIFOs 260, 261, 262 stores the filling level of the output FIFO memories 260, 261, 262 of each ARINC 429 and RS-422 port.

The FIFO memories 260, 261, 262 help to withstand the timing variations inherent in non-real-time operating systems.

The input/output device 10 comprises, in the example in FIG. 2a, a first output interface 260 of the ARINC 429 type, a second output interface 271 of the ARINC 429 type and an output interface 272 of the RS-422 type.

The output interface 270 is connected to a FIFO memory 260, the output interface 271 is connected to a FIFO memory 261 and the output interface 272 is connected to a FIFO memory 262.

The FIFO memories 260 261 and 262 are each connected to a plurality of respective registers included in the register module 252 of the frame-analysis module 250.

The frame-analysis module 250 is also connected to a register 247 by means of a module 253 in which the binary data that are to be transmitted to at least one actuator are stored.

The frame-analysis module 250 is connected to a module for managing UDP/IP 246 and MAC 245 reception layers.

The input/output device 10 is able to function with a control device 12 functioning with a real-time operating system that transmits an Ethernet frame to it periodically, for example every 2 ms. The input/output device 10, in response, transmits an Ethernet frame to the control device 12.

The input/output device 10 is able to function with a control device 12 functioning with a non-real-time operating system that transmits to it non-isochronously an Ethernet frame or a burst of Ethernet frames. The input/output device 10 counts the number of Ethernet frames in the burst received and in response transmits to the control device 12 the same number of Ethernet frames as the number of Ethernet frames received.

Figure 2B:
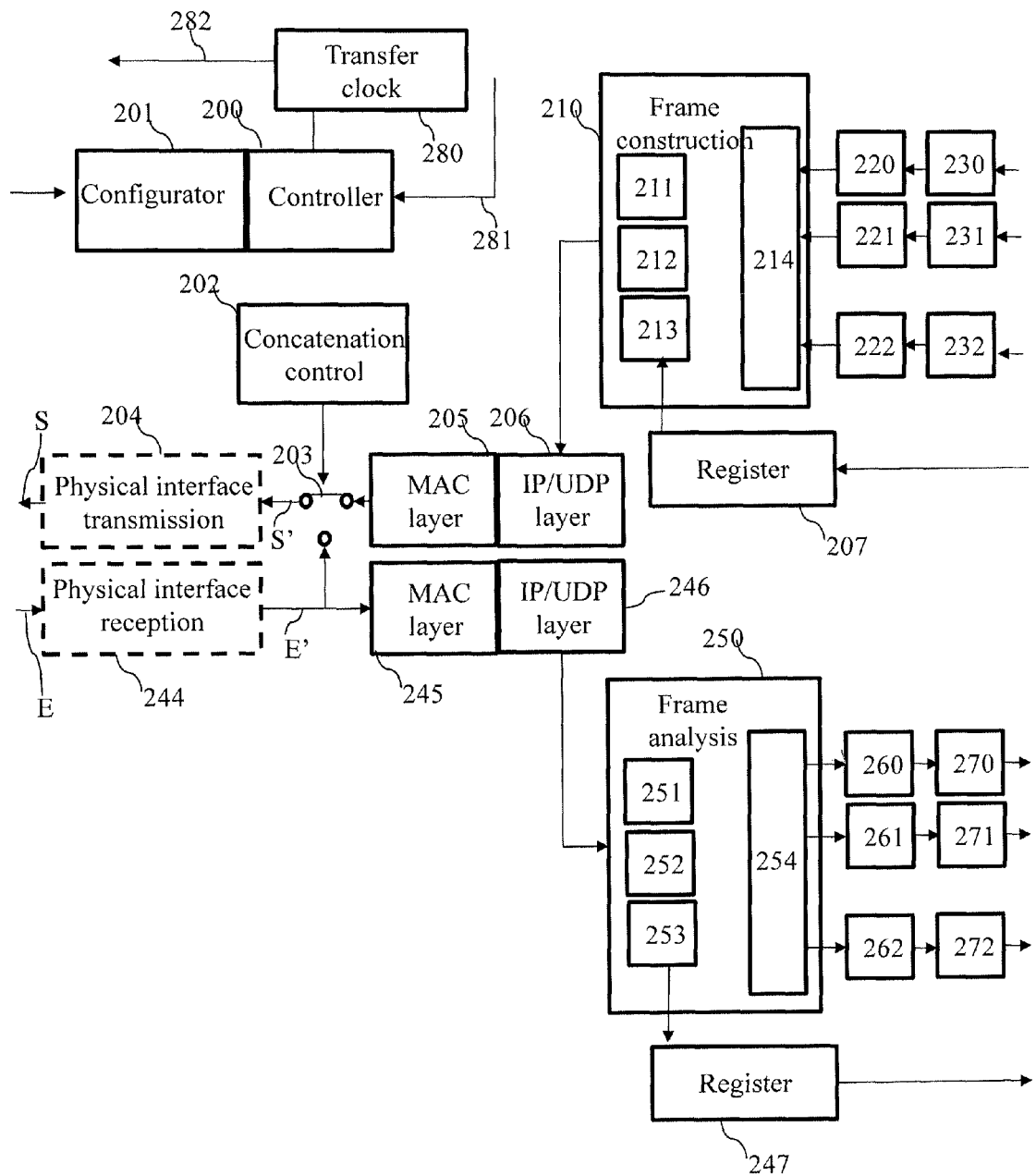
FIG. 2b depicts a second example embodiment of the input/output device accessible by means of an Ethernet connection.

FIG. 2b depicts a second example embodiment of the input/output device accessible by means of an Ethernet connection.

In the example in FIG. 2b, the input/output device 10 consists of the same elements as the input/output device 10 described with reference to FIG. 2a apart from the fact that it comprises a clock 280 controlling the transfer of Ethernet frames, an output 282 controlling the transfer of Ethernet frames connected to any input/output devices to which the input/output device 10 is interconnected, and an input 281 controlling the transfer of Ethernet frames connected to any input/output device 10 to which the input/output 10 is interconnected.

The transfer control clock 280 periodically generates a signal controlling the controller 200 so that the latter controls the transfer of at least one Ethernet frame. If the input/output device is interconnected to at least one other input/output device 100, the transfer-control clock 280 periodically generates a signal controlling at least one other input/output device 200 for transferring at least one Ethernet frame. It should be noted here that the transfer-control clock 280 is deactivated when the input/output device receives a transfer command from another input/output device 10 by means of the transfer-control input 281.

The controller 200 controls the transfer of an Ethernet frame when the control signal is received from the transfer-control clock 280 or on reception of a command to transfer an Ethernet frame by means of the transfer-control input 281 according to the value of a bit coming from the configurator 201.

Figure 2C:
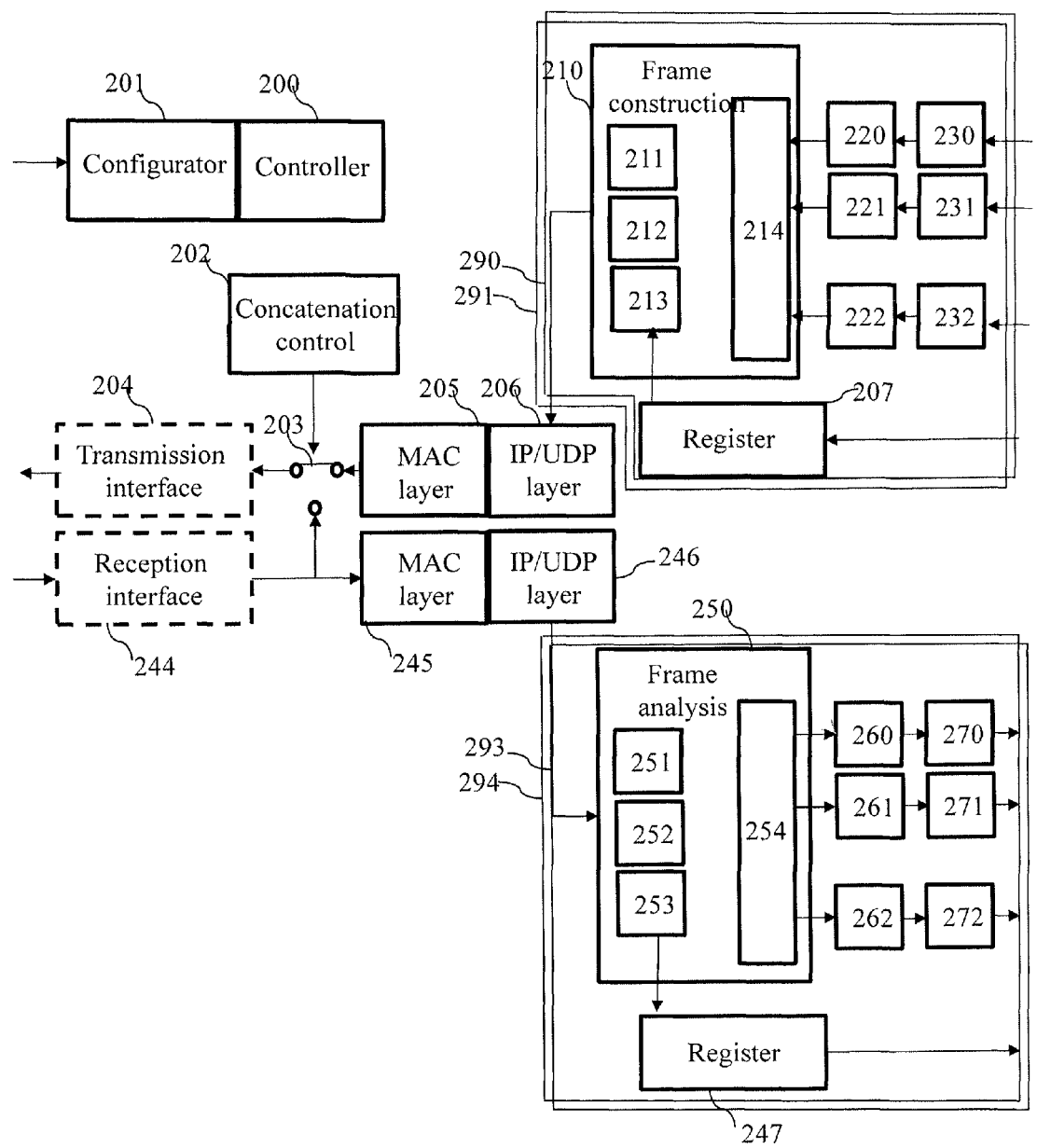
FIG. 2c depicts a third example embodiment of the input/output device accessible by means of an Ethernet connection.

FIG. 2c represents a third example embodiment of the input/output device accessible by means of an Ethernet connection.

In the example in FIG. 2c, the input/output device 10 consists of the same element as the input/output device 10 described with reference to FIG. 2a apart from the fact that the controller 200, the configurator 201, the MAC layer management modules 205 and 245, the UDP/IP transmission layer management modules 206 and 246 and the physical transmission and reception interfaces 204 and 244 are associated with a plurality of frame-construction and data-acquisition assemblies 290 and 291 and with a plurality of frame-analysis and data-transfer assemblies 293 and 294.

A frame-construction and data-acquisition assembly 290 or 291 consists of a frame-construction module 210 identical to the one described with reference to FIG. 2a, two input interfaces 230 and 231 of the ARINC 429 type identical to those described with reference to FIG. 2a, an input interface 232 of the RS-422 type identical to those described with reference to FIG. 2a, an input interface 232 of the RS-422 type identical to the one described with reference to FIG. 2a, FIFOs 220, 221 and 222 and a register 247 all identical to those described with reference to FIG. 2a.

A frame-analysis and data-transfer assembly 293 or 294 comprises a frame-analysis module 250 identical to the one described with reference to FIG. 2a, two output interfaces 270 or 271 of the ARINC 429 type identical to those described with reference to FIG. 2a, an output interface 272 of the RS-422 type identical to the one described with reference to FIG. 2a, FIFOs 260, 261 and 262 and a register 247 all identical to those described with reference to FIG. 2a.

Only two frame-construction and data-acquisition assemblies 290 and 291 and two frame-analysis and data-transfer assemblies 293 and 294 are shown in FIG. 2c. Naturally, an input/output module 10 may comprise a large number of frame-construction and data-acquisition assemblies and/or frame-analysis and data-transfer assemblies.

Figure 3A:
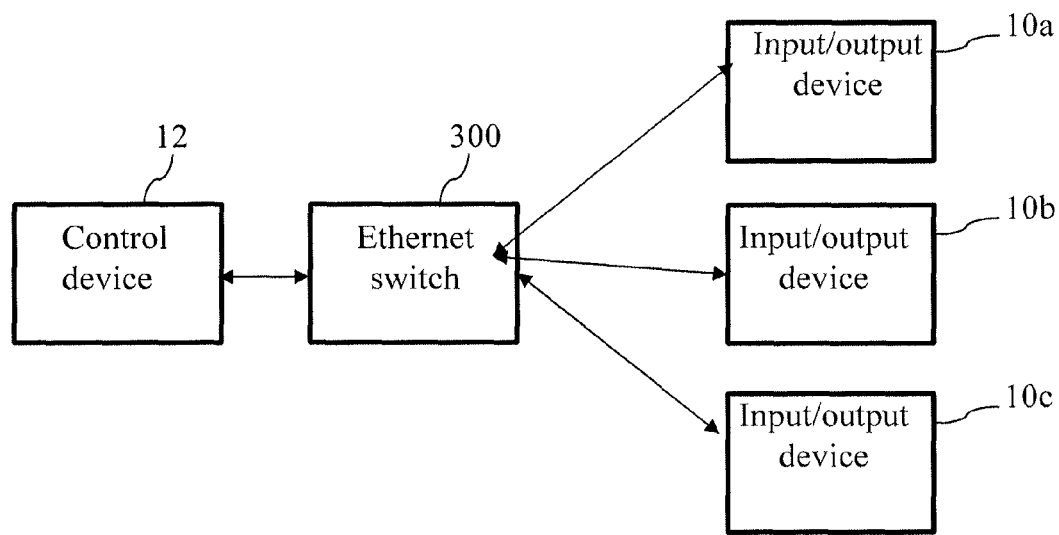
FIG. 3a depicts a first example of interconnection of a plurality of input/output devices with a control device.

FIG. 3a shows a first example of interconnection of a plurality of input/output devices with a control device.

FIG. 3a shows an example in which three input/output devices 10a, 10b and 10c are connected to the same control device 12. Naturally the present invention is also applicable when two or a number greater than three input/output devices 10 are connected to the same control device 12.

In the first interconnection example, the input/output devices 10a, 10b and 10c are connected to the control device 12 by means of an Ethernet switch 300.

This topology is based entirely on connections of the full-duplex type and therefore does not impose a sequencing constraint for exchanges between the control device 12 and the various input/output devices 10.

It should be noted here that, if the control device 12 has a sufficient number of Ethernet ports, the input/output devices 10a, 10b and 10c are each connected to a respective Ethernet port of the control device 12.

Figure 3B:
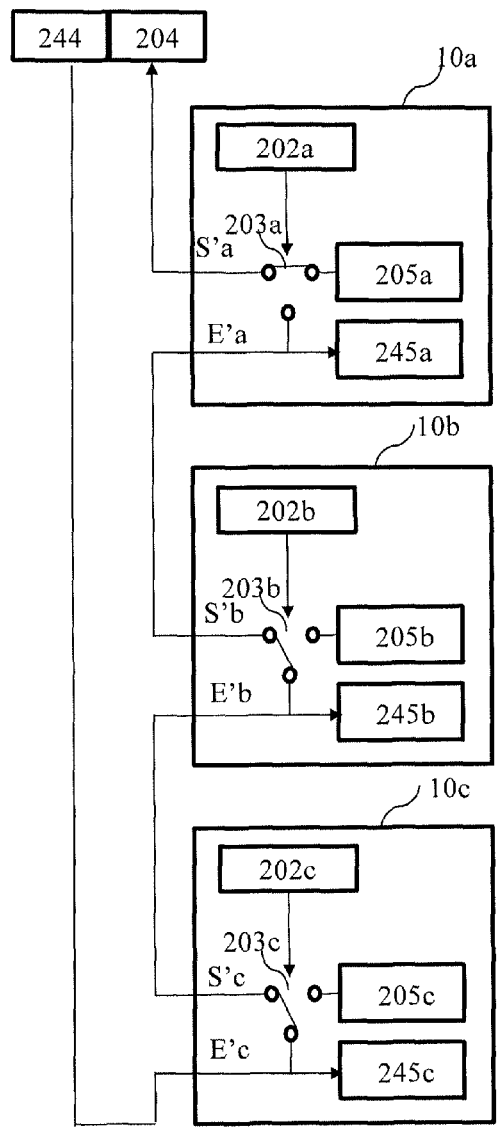
FIG. 3b depicts a second example of interconnection of a plurality of input/output devices with a control device.

FIG. 3b shows a second example of interconnection of a plurality of input/output devices accessible by means of an Ethernet connection with a control device.

FIG. 3b shows an example in which three input/output devices 10a, 10b and 10c are connected to the same control device 12. Naturally, the present invention is also applicable when two or a number greater than three input/output devices 10 are connected to the same control device 12.

In the example in FIG. 3b, the input/output devices 10a, 10b and 10c are placed on the same electronic card and share the same physical Ethernet reception interface 244 and the same physical Ethernet sending interface 204.

Only the concatenation control 202a, the switch 203a and the MAC layer management modules 205a and 245a of the input/output device 10a are shown for reasons of simplification. The same applies to the concatenation controls 202b and 202c, the switches 203b and 203c and the MAC layer management modules 205*b*, 205*c*, 245*b* and 245*c* of the input/output modules 10*b* and 10*c*.

In this interconnection example, referred to as concatenation, the concatenation control 202 of each input/output device controls the switch 203 according to a timing diagram that will be described with reference to FIG. 4*a* or 4*b*.

When an input/output device is to send an Ethernet frame to the control module 12, the switch 203 of the input/output device 10 connects the MAC layer management module 205 to the physical Ethernet transmission interface 204. The switches 203 of the other input/output devices 10 are placed in a configuration connecting the MAC layer management module 245 of their input/output device 10 to at least one MAC layer management module 245 of another input/output device 10. In the example in FIG. 3*b*, the input/output device 10*a* sends an Ethernet frame while the input/output devices 10*b* and 10*c* do not send any Ethernet frames.

Figure 3C:
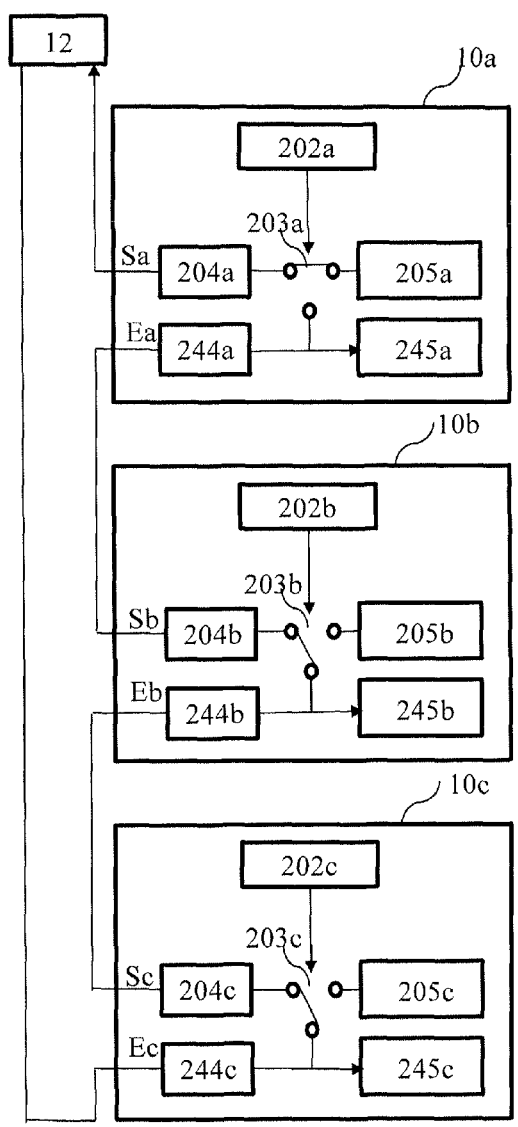
FIG. 3c depicts a third example of interconnection of a plurality of input/output devices with a control device.

The MAC layer management module of the input/output device 10*a* is connected to the output S'a, the input E'a of the input/output device 10*a* is connected to the output S'b of the input/output device 10*b*, the input E'b of the input/output device 10*b* is connected to the output S'c of the input/output device 10*c* and the input E'c of the input/output device 10*c* is connected to the physical reception interface 244. FIG. 3*c* shows a third example of interconnection of a plurality of input/output devices with a control device.

FIG. 3*c* shows an example in which three input/output devices 10*a*, 10*b* and 10*c* are connected to the same control device 12. Naturally, the present invention is also applicable when two or a number greater than three input/output devices 10 are connected to the same control device 12.

In the example in FIG. 3*c*, the input/output devices 10*a*, 10*b* and 10*c* are distant from one another. Each input/output device 10*a*, 10*b* and 10*c* has a physical Ethernet reception interface 244*a*, 244*b* and 244*c* and a physical Ethernet sending interface 204*a*, 204*b* and 204*c*.

Only the physical Ethernet reception interface 244*a*, the physical Ethernet sending interface 204*a*, the concatenation control 202*a*, the switch 203 and the MAC layer management modules 205*a* and 245*a* of the input/output module 10*a* are shown for reasons of simplification. The same applies to the physical Ethernet reception interfaces 244*b* and 244*c*, the physical Ethernet sending interfaces 204*b* and 204*c*, the concatenation controls 202*b* and 202*c*, the switches 203*b* and 203*c* and the MAC layer management modules 205*b*, 205*c*, 245*b* and 245*c* of the input/output modules 10*b* and 10*c*.

In this interconnection example, referred to as concatenation, the concatenation control of each input/output device controls the switch 203 in accordance with a timing diagram that will be described in reference to FIG. 4*a* or 4*b*.

When an input/output device is to send an Ethernet frame to the control module 12, the switch 203 of the input/output device connects the MAC layer management module 205 to the physical Ethernet transmission interface 204. The switches 203 of the other input/output devices 10 are placed in a configuration connecting the MAC layer management module 245 of their input/output devices 10 to the physical Ethernet sending interface 204 of their input/output device 10.

In the example in FIG. 3*c*, the input/output device 10*a* sends an Ethernet frame while the input/output devices 10*b* and 10*c* do not send any Ethernet frames.

The MAC layer management module of the input/output device 10*a* is connected to the physical transmission interface 204, the input Ea of the input/output device 10*a* is connected to the output Sb of the input/output device 10*b*, the input Eb of the input/output device 10*b* is connected to the output Sc of the input/output device 10*c* and the input Ec of the input/output device 10*c* is connected to the physical reception interface 244.

Figure 3D:
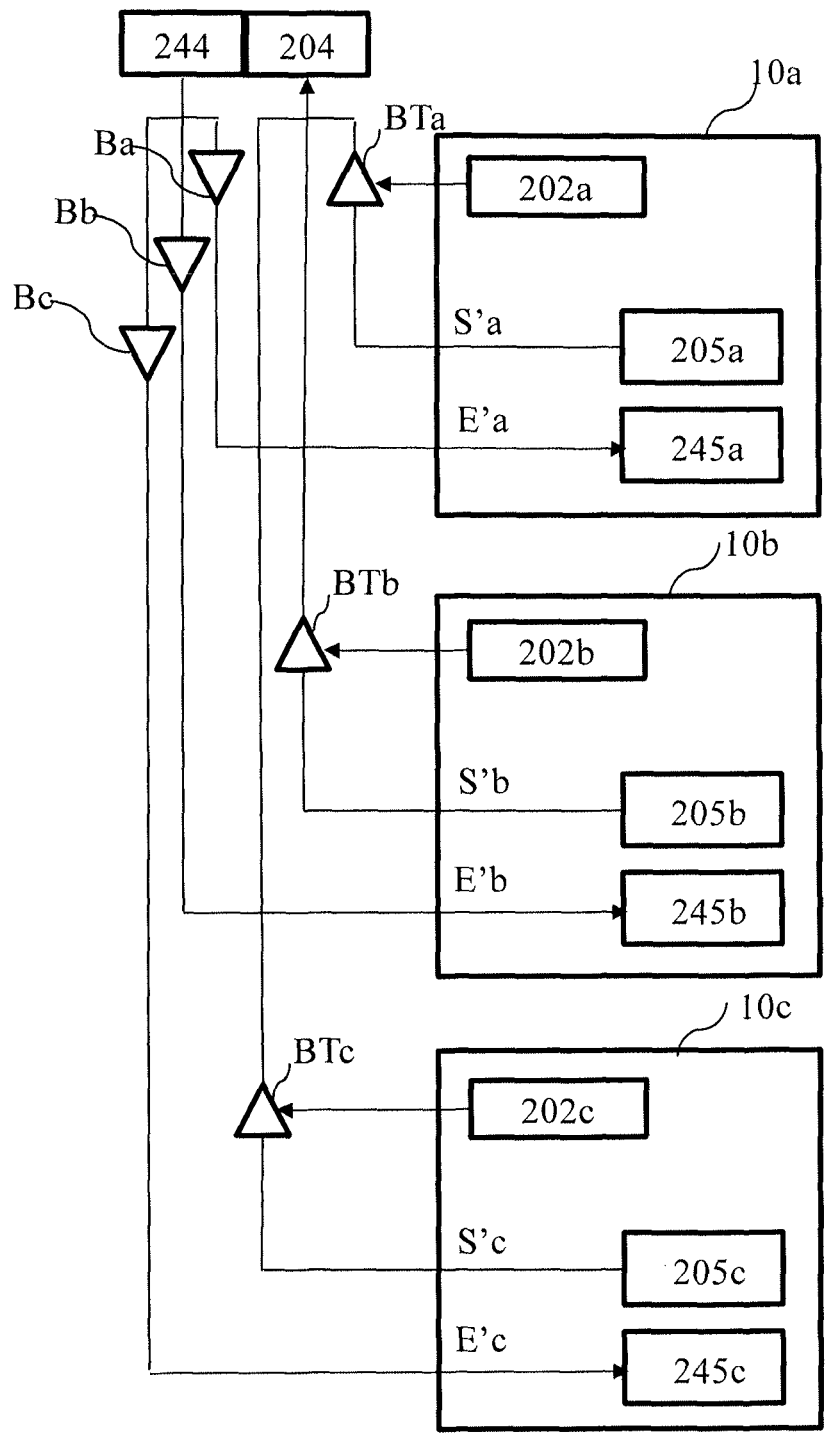
FIG. 3d depicts a fourth example of interconnection of a plurality of input/output devices with a control device.

FIG. 3*d* shows a fourth example of interconnection of a plurality of input/output devices with a control device.

FIG. 3*d* shows an example in which three input/output devices 10*a*, 10*b* and 10*c* are connected to the same control device 12. Naturally the present invention is also applicable when two or a number greater than three input/output devices 10 are connected to the same control device 12.

In the example in FIG. 3*d*, the input/output devices 10*a*, 10*b* and 10*c* are placed on the same electronic card and share the same physical Ethernet reception interface 244 and the same physical Ethernet sending interface 204.

Only the concatenation control 202*a* and the MAC layer management modules 205*a* and 245*a* of the input/output module 10*a* are shown for reasons of simplification. The same applies to the concatenation controls 202*b* and 202*c* and the MAC layer management modules 205*b*, 205*c*, 245*b* and 245*c* of the input/output modules 10*b* and 10*c*.

In this interconnection example, referred to as double-stream concatenation, the MAC layer management modules 245*a*, 245*b* and 245*c* are connected to the physical Ethernet reception interface 244 respectively by means of follower ports Ba, Bb and Bc. In the sending direction, the concatenation control 202 of each input/output device 10 controls a three-state port. The concatenation control 202 puts the output of the port at high impedance when the input/output device 10 is not sending a frame to the control device 10 and controls the three-state port so that it is in a follower mode when the input/output device 10 sends a frame to the control device 12.

The concatenation control 202*a* controls the three-state port BTa, the concatenation control 202*b* controls the three-state port BTb and the concatenation control 202*c* controls the three-state port BTc.

The switches 203*a*, 203*b* and 203*c*, not shown in FIG. 3*d*, respectively connect the MAC layer management modules 205*a*, 205*b* and 205*c* to the inputs of the three-state ports BTa, BTb and BTc.

The outputs of the three-state ports BTa, BTb and BTc are connected together to the physical Ethernet transmission interface 204.

The output S'a of the input/output device 10*a* is connected to the input of the three-state port BTa, the output S'b of the input/output device 10*b* is connected to the input of the three-state port BTb and the output S'c of the input/output device 10*c* is connected to the input of the three-state port BTc.

The input E'a of the input/output device 10*a* is connected to the output of the port Ba, the input E'b of the input/output device 10*b* is connected to the output of the port Bb and the input E'c of the input/output device 10*c* is connected to the output of the port Bb.

Figure 3E:
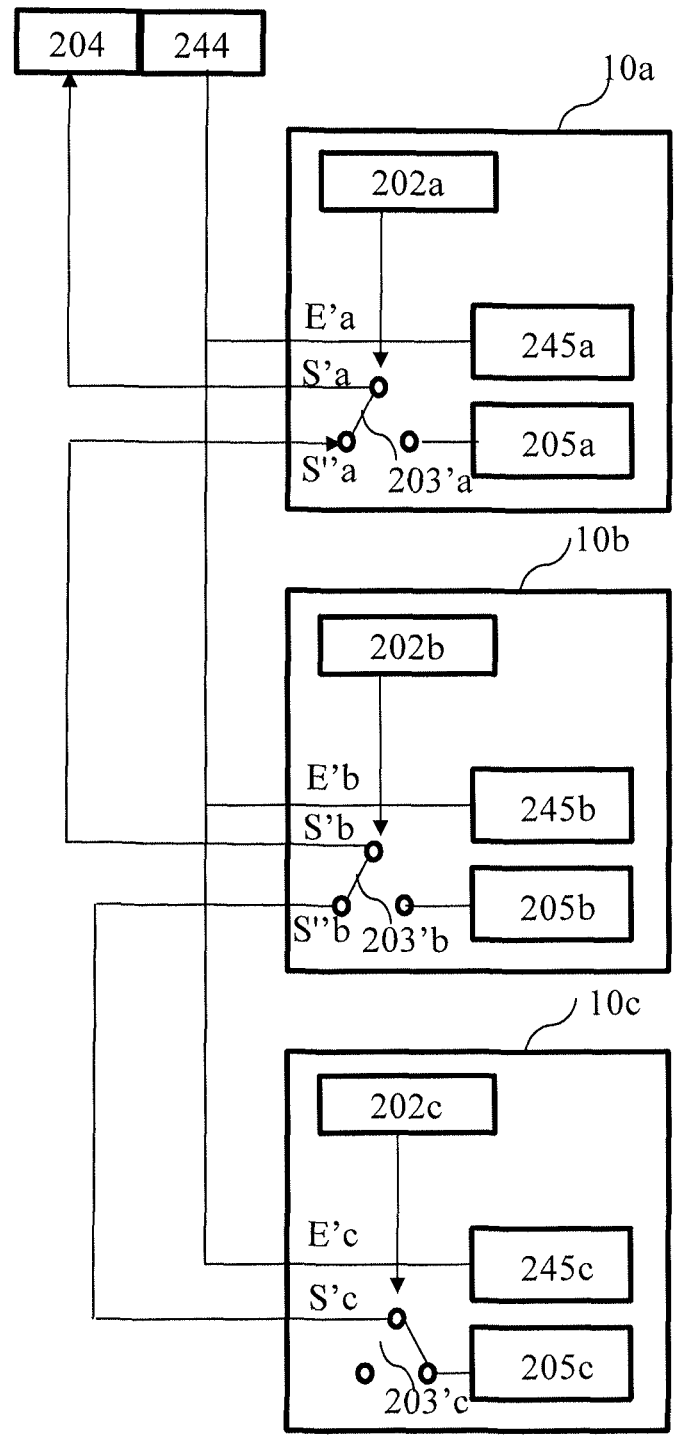
FIG. 3e depicts a fifth example of interconnection of a plurality of input/output devices with a control device.

FIG. 3*e* shows a fourth example of interconnection of a plurality of input/output devices with a control device.

FIG. 3*e* shows an example in which three input/output devices 10*a*, 10*b* and 10*c* are connected to the same control device 12. Naturally the present invention is also applicable when two or a number greater than three input/output devices 10 are connected to the same control device 12.

In the example in FIG. 3*e*, the input/output devices 10*a*, 10*b* and 10*c* are placed on the same electronic card and share the same physical Ethernet reception interface 244 and the same physical Ethernet sending interface 204.

Only the concatenation control 202a, the switch 203'a and the MAC layer management modules 205a and 245a of the input/output module 10a are shown for reasons of simplification. The same applies to the concatenation controls 202b and 202c, the switches 203'b and 203'c and the MAC layer management modules 205b, 205c, 245b and 205c of the input/output modules 10b and 10c.

In this type of interconnection, referred to as double-stream concatenation, the MAC layer management modules 245a, 245b and 245c are connected to the physical Ethernet reception interface 244 by the connections denoted E'a for the input/output device 10a, E'b for the input/output device 10b and E'c for the input/output device 10c.

Each switch 203' comprises three terminations. A first termination is connected to a termination of another switch 203' or is not connected. This termination is denoted S"a for the input/output device 10a and S"b for the input/output 10b.

A second termination is connected to the MAC layer management module 205.

The third termination is connected either to the physical Ethernet sending interface 204 or to a termination of another switch 203'. This termination is denoted S'a for the input/output device 10a, S'b for the input/output device 10b and S'c for the input/output device 10c.

The termination S'c is connected to the termination S"b, the termination S'b is connected to the terminal S"a and the termination S'a is connected to the physical Ethernet sending interface 204.

When an input/output device 10 is to send an Ethernet frame to the control module 12, the switch 203' of the input/output device 10 connects the MAC layer management module 205 to another switch 203' or to the physical Ethernet transmission interface 204.

In the example in FIG. 3e, the input/output device 10c sends a frame and the latter passes through the switches 203'c, 203'b and 203'a in order to arrive at the physical Ethernet reception interface 244.

The double-stream concatenation mode of FIGS. 3d and 3d makes it possible to relax the isochronism constraint on the frames sent by the control device 12 and is particularly well suited when the control device 12 has a non-real-time operating system.

Figure 4A:
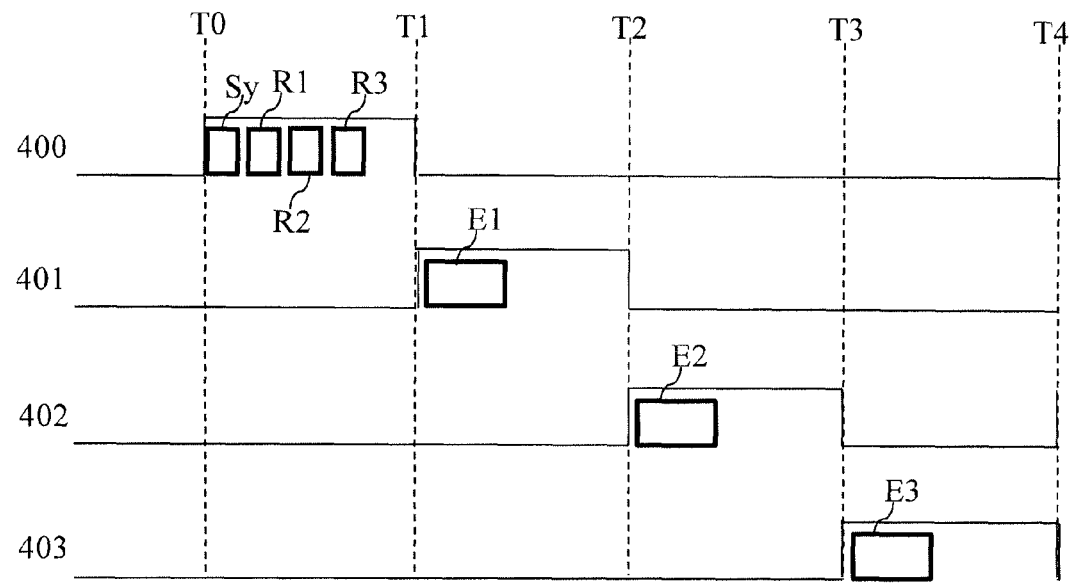
FIG. 4a depicts a first example of a timing diagram for transferring frames between the control device and the plurality of input/output devices according to the second, third, fourth and fifth examples of interconnections.

FIG. 4a shows a first example of a timing diagram for transferring frames between the control device and the plurality of input/output devices according to the second, third, fourth and fifth examples of interconnections.

In the timing diagram of FIG. 4a, the control device 12 has a real-time operating system.

The control device 12 sends, between time T0 and T1, an Ethernet broadcast frame. The broadcast frame Sy is intended for all the input/output devices 10 and affords synchronisation of the input/output devices 10. The control device 12 next sends an Ethernet frame R1 to the input/output device 10a, an Ethernet frame R2 to the input/output device 10b and an Ethernet frame R3 to the input/output device 10c.

The input/output devices 10a, 10b and 10c respond to the control device 10 in a predefined order indicated by means of at least two binary inputs of their respective configurator 201.

The input/output device 10a sends an Ethernet frame E1 to the control device 12 between times T1 and T2 determined from the time of reception of the Ethernet synchronisation frame Sy.

The input/output device 10b sends an Ethernet frame E2 to the control device 12 between times T2 and T3 determined from the time of reception of the Ethernet synchronisation frame S.

The input/output device 10c sends an Ethernet frame E3 to the control device 12 between times T3 and T4 determined from the time of reception of the Ethernet synchronisation frame Sy. The Ethernet frame transmission cycle between times T0 and T4 is then reiterated with the same periodicity.

In the interconnection example described with reference to FIG. 3b, the switch 203a of the input/output device 10a connects the MAC layer management module 205a to the output S'a during the period of time lying between T1 and T2.

The switch 203a of the input/output device 10a connects the input E'a to the output S'a during the period of time lying between T0 and T1 and between T2 and T4. This configuration is referred to as looping back from the input to the output in that the frames arriving by the interconnection at the MAC layer management module 245a are transferred to the output of the Ethernet connection.

The switch 203b of the input/output device 10b connects the input of the MAC layer management module 205b to the output S'b during the period of time lying between T2 and T3. The switch 203b of the input/output device 10b connects the output S'b to the input E'b during the periods of time lying between T0 and T2 and between T3 and T4.

The switch 203b of the input/output device 10b connects the input of the MAC layer management module 205b to the output S'b during the period of time lying between T2 and T3. The switch 203b of the input/output device 10b connects the output S'b of the input E'b during the periods of time lying between T0 and T2 and between T3 and T4.

The switch 203c of the input/output device 10c connects the input of the MAC layer management module 205c to the output S'c during the period of time lying between T3 and T4. The switch 203c of the input/output devices 10c connects the output S'c to the input E'c during the period of time lying between T0 and T3.

In the interconnection example described with reference to FIG. 3c, the switch 203a of the input/output device 10a connects the MAC layer management module 205a to the output Sa during the period of time lying between T1 and T2.

The switch 203a of the input/output device 10a connects the input Ea to the output Sa during the period of time lying between T0 and T1 and between T2 and T4.

The switch 203b of the input/output device 10b connects the input of the MAC layer management module 205b to the output Sb during the period of time lying between T2 and T3. The switch 203b of the input/output device 10b connects the output Sb of the input Eb during the periods of time lying between T0 and T2 and T3 and T4.

The switch 203c of the input/output device 10c connects the input of the MAC layer management module 205c to the output Sc during the period of time lying between T3 and T4. The switch 203c of the input/output devices 10c connects the output Sc to the input Ec during the period of time lying between T0 and T3.

In the interconnection example described with reference to FIG. 3d, the switches 203a, 203b and 203 permanently connect respectively the MAC management modules 205a, 205b and 205c respectively to the outputs S1a, S'b and S'c. The concatenation control module 202a controls the port BTa so that the frame or frames transferred by the MAC layer management module 205a is or are transferred to the physical Ethernet transmission interface 204 during the period of time lying between T1 and T2.

The concatenation control 202a puts the three-state port BTa to the high-impedance state during the period of time from T0 to T1 and T2 to T4.

The concatenation control module 202b controls the port BTb so that the frame or frames transferred by the MAC layer management module 205b is or are transferred to the physical Ethernet transmission interface 204 during the period of time lying between T2 and T3.

The concatenation control 202b puts the three-state port BTb to the high-impedance state during the period of time from T0 to T1 and T2 to T4.

The concatenation control module 202c controls the port BTc so that the frame or frames transferred by the MAC layer management module 205c is or are transferred to the physical Ethernet transmission interface 204 during the period of time lying between T3 and T4.

The concatenation control 202c puts the three-state port BTc to the high-impedance state during the period of time lying between T0 and T3.

In the interconnection example described with reference to FIG. 3e, the switch 203'a of the input/output device 10a connects the MAC layer management module 205a to the physical Ethernet transmission interface 204 during the period of time lying between T1 and T2 and connects S'a to S"a during the period of time lying between T0 and T1 and between T2 and T4.

The switch 203'b of the input/output device 10b connects the MAC layer management module 205b to S'b during the period of time lying between T2 and T3 and connects S'b and S"b during the periods of time lying between T0 and T2 and between T3 and T4.

The switch 203'c of the input/output device 10c connects the MAC layer management module 205c to S'c only during the period of time lying between T3 and T4.

Figure 4B:
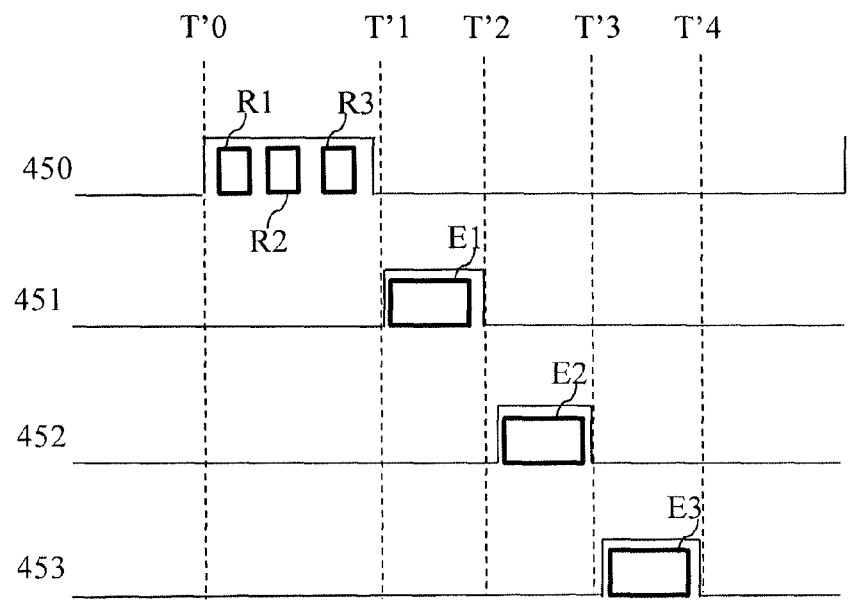
FIG. 4b depicts a second example of a timing diagram for transferring frames between the control device and the plurality of input/output devices according to the second, third, fourth and fifth examples of interconnections.

FIG. 4b shows a second example of a timing diagram for transferring frames between the control device and the plurality of input/output devices according to the second, third, fourth and fifth examples of interconnections.

In the timing diagram in FIG. 4b, the control device 10 has an operating system, real time or not.

Unlike the timing diagram in FIG. 4a, the control device 12 does not send any synchronisation Ethernet frames.

The control device 12 sends, between time T0 and T1, at least one Ethernet frame R1 to the input/output device 10a, at least one Ethernet frame R2 to the input/output device 10b and at least one Ethernet frame R3 to the input/output device 10c.

The input/output devices 10a, 10b and 10c respond to the control device 12 in a predefined order indicated by means of at least two binary inputs of the configurator 201.

When the input/output device 10a detects at time T'1 the end of the transmission of an Ethernet frame or burst of frames to the input/output device 10c, the input/output device 10a transmits at least one Ethernet frame E1 to the control device 12.

When the input/output device 10b detects at time T'2 the end of the transmission of an Ethernet frame or burst of frames by the input/output device 10a to the control device 12, the input/output device 10b transmits at least one Ethernet frame E2 to the control device 12.

When the input/output device 10c detects at time T'3 the end of the transmission of an Ethernet frame or burst of frames by the input/output device 10a to the control device 12, the input/output device 10c transmits at least one Ethernet frame E3 to the control device 12.

When the control device 12 detects the end of the transmission of an Ethernet frame or burst of frames by the input/output device 10c to the control device 12, the control device 12 can recommence the transmission of Ethernet frames.

In the interconnection example described with reference to FIG. 3b, the switch 203a of the input/output device 10a connects the MAC layer management module 205a to the output S'a during the period of time lying between T'1 and T'2.

The switch 203a of the input/output device 10a connects the input E'a to the output S'a during the period of time lying between T'0 and T'1 and between T'2 and T'4. This configuration is referred to as looping back from the input to the output in that the frames arriving by the Ethernet connection at the MAC layer management module 245a are transferred to the output of the Ethernet connection.

The switch 203b of the input/output device 10b connects the input of the MAC layer management module 205b to the output S'b during the period of time lying between T'2 and T'3. The switch 203b of the input/output device 10b connects the output S'b to the input E'b during the periods of time lying between T'0 and T'2 as well as T'3 and T'4.

The switch 203c of the input/output device 10c connects the input of the MAC layer management module 205c to the output S'c during the period of time lying between T'3 and T'4. The switch 203c of the input/output device 10c connects the output S'c to the input E'c during the period of time lying between T'0 and T'3.

In the interconnection example described with reference to FIG. 3c, the switch 203a of the input/output device 10a connects the MAC layer management module 205a to the output Sa during the period of time lying between T'1 and T'2.

The switch 203a of the input/output device 10a connects the input Ea to the output Sa during the period of time lying between T'0 and T'1 and between T'2 and T'4.

The switch 203b of the input/output device 10b connects the input of the MAC layer management module 205b to the output Sb during the period of time lying between T2 and T3. The switch 203b of the input/output device 10b connects the output Sb to the input Eb during the periods of time lying between T'0 and T'2 and between T'3 and T'4.

The switch 203c of the input/output device 10c connects the input of the MAC layer management module 205c to the output Sc during the period of time lying between T'3 and T'4. The switch 203c of the input/output device 10c connects the output Sc to the input Ec during the period of time lying between T'0 and T'3.

In the interconnection example described with reference to FIG. 3d, the switches 203a, 203b and 203 permanently connect respectively the MAC layer management modules 205a, 205b and 205c respectively to the outputs S1a, S'b and S'c.

The concatenation control module 202a controls the port BTa so that the frame or frames transferred by the MAC layer management module 205a is or are transferred to the physical Ethernet transmission interface 204 during the period of time lying between T'1 and T'2.

The concatenation control module 202a puts the three-state port BTa to the high-impedance state during the period of time lying between T'0 and T'1 and between T'2 and T'4.

The concatenation control module 202b controls the port BTb so that the frame or frames transferred by the MAC layer management module 205b is or are transferred to the physical Ethernet transmission interface 204 during the period of time lying between T'2 and T'3.

The concatenation control module 202b puts the three-state port BTb to the high-impedance state during the period of time lying between T'0 and T'1 and between T'3 and T'4.

The concatenation control module 202c controls the port BTc so that the frame or frames transferred by the MAC layer management module 205c is or are transferred to the physical Ethernet transmission interface 204 during the period of time lying between T'3 and T'4.

The concatenation control module 202b puts the three-state port BTb to the high-impedance state during the period of time lying between T'0 and T'3.

In the interconnection example described with reference to FIG. 3e, the switch 203'a of the input/output device 10a connects the MAC layer management module 205a to the physical Ethernet transmission interface 204 during the period of time lying between T'1 and T'2 and connects S'a to S"a during the period of time lying between T'0 and T'1 and between T'2 and T'4.

The switch 203'b of the input/output device 10b connects the MAC layer management module 205b to S'b during the period of time lying between T'2 and T3 and connects S'b and S"b during the periods of time lying between T'0 and T'2 and between T'3 and T'4.

The switch 203'c of the input/output device 10c connects the MAC layer management module 205c to S'c only during the period of time lying between T'3 and T'4.

Naturally the present invention is in no way limited to the embodiments described here but quite the contrary encompasses any variant within the capability of a person skilled in the art and particularly the combination of various embodiments of the present invention.

The invention claimed is:

1. An Input/output device transferring and/or receiving data to and/or from a control device, transmitting data from a volatile memory by means of a mechanism for direct access to the memory, wherein the input/output device transfers the data to the control device over a physical connection of the Ethernet type according to a UDP/IP protocol, the input/output device being connected to a plurality of data processing or acquisition devices by means of at least one connection different from the Ethernet physical memory, the input/output device comprises a MAC layer management module and circuitry causing the device to connect the MAC layer management module to an Ethernet physical transmission interface, the circuitry causing the device to connect the MAC layer management module to the Ethernet physical transmission interface being able to connect a MAC layer management module of at least one other input/output device to the Ethernet physical transmission interface in order to connect the at least one other input/output device to the Ethernet connection and the input/output device comprises circuitry causing the device to manage the transmission over the Ethernet connection of the data transmitted by the input/output devices to the control device.

2. The device according to claim 1, wherein the input/output device comprises circuitry causing the device to construct Ethernet frames, circuitry causing the device to analyse Ethernet frames and circuitry causing the device to store data.

3. The device according to claim 1, wherein the circuitry causing the device to connect consist of a switch, the switch allowing the transfer of Ethernet frames by the input/output device to the control device or allowing the transfer of Ethernet frames by the other input/output device to the control device.

4. The device according to claim 1, wherein the circuitry causing the device to connect consist of a three-state logic gate controlled so as to be in a high-impedance state when the input/output device is not transferring any Ethernet frames to the control device.

5. The device according to claim 1, wherein the circuitry causing the device to manage transmission over the Ethernet connection trigger the transfer of an Ethernet frame by the input/output device to the control device following the reception of a synchronisation Ethernet frame sent by the control device.

6. The device according to claim 1, wherein the circuitry causing the device to manage the transmission over the Ethernet connection trigger the transfer of an Ethernet frame by the input/output device to the control device following the reception of an Ethernet frame sent by the control device to one of the input/output devices or following the transmission of an Ethernet frame sent by the other input/output device.

7. The device according to claim 5, wherein the input/output device comprises circuitry causing the device to select the moment at which the input/output device transfers the Ethernet frame to the control device.

8. The device according to claim 1, wherein the circuitry causing the device to manage the transmission over the Ethernet connection trigger the transfer of an Ethernet frame by the input/output device to the control device at a rate predetermined by a clock.

9. The device according to claim 8, wherein it further comprises circuitry causing the device to notify to the other input/output device the instant at which the other input/output device is to transfer an Ethernet frame by means of the input/output device to the control device.

10. The device according to claim 8, wherein it further comprises circuitry causing the device to receive from the other input/output device the instant at which the input/output device is to transfer an Ethernet frame by means of the input/output device to the control device.

11. A system comprising an input/output device and a control device, the input/output device transferring and/or receiving data to and/or from a control device, transmitting the data from a volatile memory by means of a mechanism for direct access to the memory, wherein the input/output device transfers the data to the control device over a physical connection of the Ethernet type according to a UDP/IP protocol, the input/output device being connected to a plurality of data processing or acquisition devices by means of at least one connection different from the Ethernet physical connection, the input/output device comprises a MAC layer management module and circuitry causing the device to connect the MAC layer management module to an Ethernet physical transmission interface, the circuitry causing the device to connect the MAC layer management module to the Ethernet physical transmission interface being able to connect an MAC layer management module of at least one other input/output device to the Ethernet physical transmission interface in order to connect the at least one other input/output device to the Ethernet connection and the input/output device comprises circuitry causing the device to manage the transmission over the Ethernet connection of the data transmitted by the input/output devices to the control device.

12. An aircraft comprising the system according to claim 11.

* * * * *